United States Patent
Bommarito et al.

[11] Patent Number: 5,825,526
[45] Date of Patent: Oct. 20, 1998

[54] TAPE FOR USE IN MANUFACTURING ELECTROCHROMIC DEVICES

[75] Inventors: Silvia L. Bommarito, Stillwater; Kejian Chen; Peter F. Cullen, both of Woodbury; L. Charles Hardy, St. Paul; Paul S. Lugg, Woodbury, all of Minn.

[73] Assignee: Minnesota Mining and Manufacturing Company, St. Paul, Minn.

[21] Appl. No.: 639,019

[22] Filed: Apr. 24, 1996

[51] Int. Cl.$^6$ .............. G02F 1/15; G02F 1/155; G02F 1/153
[52] U.S. Cl. .......... 359/265; 359/268; 359/269; 359/270; 359/273; 359/274; 359/275
[58] Field of Search ............ 359/265, 268–270, 359/273, 274, 275

[56] References Cited

U.S. PATENT DOCUMENTS

| | | | |
|---|---|---|---|
| 4,435,048 | 3/1984 | Kamimori et al. | 359/275 |
| 4,465,339 | 8/1984 | Baucke et al. | 350/357 |
| 4,902,108 | 2/1990 | Byker | 350/357 |
| 5,028,124 | 7/1991 | Akhtar | 350/357 |
| 5,054,894 | 10/1991 | Warszawski | 359/270 |
| 5,056,899 | 10/1991 | Warszawski | 350/357 |
| 5,071,233 | 12/1991 | Habib et al. | 359/275 |
| 5,074,648 | 12/1991 | Warszawski | 359/265 |
| 5,078,480 | 1/1992 | Warszawski | 359/265 |
| 5,080,470 | 1/1992 | Warszawski | 359/265 |
| 5,082,355 | 1/1992 | Warszawski | 359/265 |
| 5,124,080 | 6/1992 | Shabrang et al. | 252/583 |
| 5,202,788 | 4/1993 | Weppner | 359/265 |
| 5,231,531 | 7/1993 | Defendini et al. | 359/275 |
| 5,384,653 | 1/1995 | Benson et al. | 359/270 |
| 5,408,353 | 4/1995 | Nichols et al. | 359/270 |
| 5,419,854 | 5/1995 | Wakabayashi et al. | 252/583 |

FOREIGN PATENT DOCUMENTS

| | | |
|---|---|---|
| 2123459 | 9/1995 | Canada . |
| 0 492 387 A2 | 7/1992 | European Pat. Off. . |
| 1240674 | 12/1993 | Italy . |
| 58-134623 | 10/1983 | Japan . |
| WO 89/10578 | 11/1989 | WIPO . |
| WO 96/24882 | 8/1996 | WIPO . |

OTHER PUBLICATIONS

NTIS Tech Notes, "Electrochromatic Optical Switching Device", Jul. 1992, Springfield, VA.

Passerini et al., *Laminated Electrochromic Windows Based on Nickel Oxide, Tungsten Oxide, and Gel Electrolytes*: J. Electrochem. Soc., vol. 141(4), pp. W25–28 (1994).

Byker, *Commercial Developments in Electrochromics*: Proc. of the Symp. On Electrochromic Materials II, vol. 94–2, pp. 3–13 (1994).

Benson et al., *Wanted: Smart Windows That Save Energy*; NREL In Review, pp. 12–16 (1992).

Skerrett, *Through the Glass Darkly*; Popular Science, pp. 80–87 (1993).

Kunde et al., *Conductivity behavior of modified polysiloxane—NaI polymer complexes*; J. Mat. Sci. Lett. 14:271–74 (1995).

Lippens et al., *Society of Vacuum Coaters*; 37th Annual Tech. Conf. Proc., pp. 254–260 (1994).

*Primary Examiner*—David C. Nelms
*Assistant Examiner*—Evelyn A. Lester
*Attorney, Agent, or Firm*—Robert W. Sprague; Harold C. Knecht, III; Brian E. Szymanski

[57] ABSTRACT

A tape that includes an electronically conductive flexible substrate, a release layer, and an adhesive comprising an ion-intercalating material, and electrochromic devices and glazing units prepared using this tape.

28 Claims, 5 Drawing Sheets

Fig.6

TAPE FOR USE IN MANUFACTURING ELECTROCHROMIC DEVICES

This invention was made with government support under the Cooperative Agreement No. 70NANB3H1377 awarded by the National Institute of Standards and Technology of the Department of Commerce. The United States Government has certain rights in the invention.

BACKGROUND OF THE INVENTION

This invention relates to manufacturing electrochromic devices.

Electrochromic materials undergo a color change upon oxidation or reduction. In an ion-intercalation electrochromic device, an electrochromic material and an ion-storage counterelectrode material are separated by an ion-conducting electrolyte. The optical properties of the electrochromic material change when ions (e.g., hydrogen ions or metal ions such as lithium ions) intercalated within the structure of the ion-storage material are removed and intercalated within the structure of the electrochromic material in response to an applied electrical potential. The ions are removed and returned to the ion-storage material by reversing the polarity of the applied potential, thereby returning the electrochromic material to its original optical state.

SUMMARY OF THE INVENTION

In a first aspect, the invention features a tape that includes an electronically conductive flexible substrate, a release layer (which may be continuous or discontinuous), and an adhesive that includes an ion-intercalating material. An "adhesive" includes both single and multi-layer constructions that display adhesive properties at ambient conditions or develop such properties, e.g., upon swelling with solvent or exposure to elevated temperature. The "adhesive" includes embodiments where the ion-intercalating material itself displays adhesive properties, as well as constructions where the ion-intercalating material is combined with one or more additional materials (e.g., in the form of separate layers or admixed with the ion-intercalating material), with the net result that the aggregate construction displays adhesive properties.

An "ion-intercalating" material is a material whose microstructure is configured such that ions (e.g., hydrogen or metal ions such as lithium ions) can be reversibly intercalated into the material in response to an applied electrical potential.

In one preferred embodiment, the ion-intercalating material is disposed between the substrate and the release layer. In another preferred embodiment, the release layer is a low surface energy coating provided on one surface of the substrate, the ion-intercalating material being provided on the opposing surface of the substrate.

Preferably, the adhesive is a pressure sensitive adhesive. Examples of preferred adhesive constructions include electrochromic materials (e.g., $WO_3$), which may further be provided with an ion-conducting polymer electrolyte. As used herein, "electrochromic material" refers to materials both with and without intercalated ions. Thus, for example, in the case of $WO_3$, it includes both $WO_3$ and $M_xWO_3$, where M is an intercalated hydrogen or metal ion. Another preferred adhesive construction includes ion-storage materials (e.g., $V_2O_5$), which may further be provided with an ion-conducting polymer electrolyte.

One example of a preferred construction is one in which the electrochromic or ion-storage material itself is not adhesive, but the polymer electrolyte is. The aggregate construction (electrochromic or ion-storage material plus polymer electrolyte) thus constitutes the "adhesive."

One preferred flexible substrate includes polyethylene terephthalate provided with a transparent conductor. The flexible substrate may also be reflective. For example, it may include a layer of a reflective material such as silver.

The invention further features a method of assembling an electrochromic device using the above-described tapes that includes contacting a second electronically conductive substrate with the adhesive portion of the tape, and then laminating the tape and the second electronically conductive substrate together. Preferably, the second substrate includes a rigid material such as glass provided with a transparent conductor.

In the case of embodiments in which the tape includes an electrochromic material such as $WO_3$ and an ion-conducting polymer electrolyte, the second substrate preferably includes an ion-storage material such as $V_2O_5$. Conversely, in the case of embodiments in which the tape includes an ion-storage material such as $V_2O_5$ and an ion-conducting polymer electrolyte, the second substrate preferably includes an electrochromic material such as $WO_3$.

In another aspect, the invention features an electrochromic device that includes an ion-intercalating electrochromic material and an ion-intercalating ion-storage material separated by an ion-conducting electrolyte and disposed between a rigid, electronically conductive substrate and a flexible, electronically conductive substrate. The electrolyte preferably is an ion-conducting polymer electrolyte in the form of an adhesive.

In yet another aspect, the invention features a glazing unit that includes (a) an electrochromic device disposed between a pair of electronically conductive substrates, one of which is a rigid, transparent substrate and the other of which is a flexible, transparent substrate and (b) a second, rigid transparent substrate adjacent the flexible, transparent substrate. The electrochromic device includes an ion-intercalating electrochromic material and an ion-intercalating ion-storage material separated from each other by an ion-conducting electrolyte. Preferably, the electrolyte is an ion-conducting polymer in the form of an adhesive. The glazing unit may further include a third rigid, transparent substrate spaced apart from either the first or second rigid, transparent substrate to define a thermal break.

Flexible tapes according to the invention offer several advantages over existing materials in the manufacture of electrochromic devices. For example, because the tapes are flexible, they can be provided in the form of rolls and dispensed in the appropriate size when needed. The tapes are thus suitable for mass production of large area devices (e.g., light modulating devices).

The combination of rigid and flexible substrates in the case of devices featuring, e.g., electrochromic and ion-storage materials separated by an ion-conducting electrolyte is advantageous as well. The rigid substrate facilitates the deposition of the electrochromic material, leading to higher quality electrochromic material. The flexible substrate is easier to laminate to the rigid substrate compared to another rigid substrate, resulting in fewer defects such as air bubbles; such defects can compromise the electrical and optical properties of the device. The flexible substrate also provides the manufacturing advantages described above.

Other features and advantages of the invention will be apparent from the following description of the preferred embodiments thereof, and from the claims.

DESCRIPTION OF THE PREFERRED EMBODIMENTS

Figure 1A:
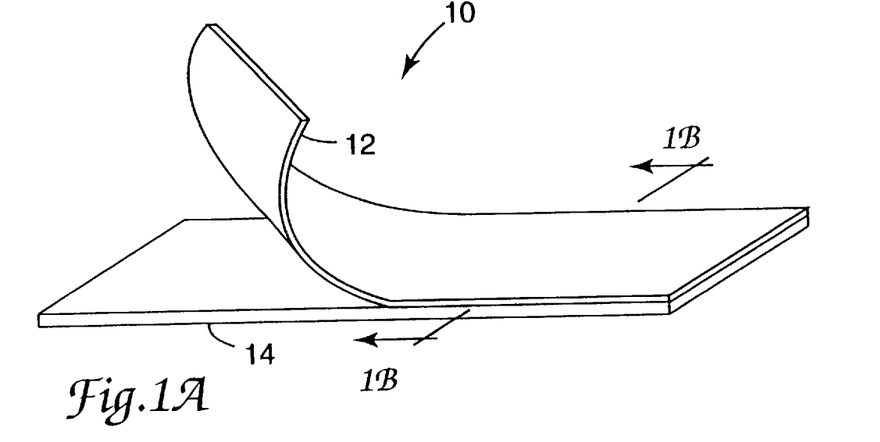
FIG. 1A is a perspective view of an electrochromic device featuring a pair of flexible and rigid substrates partially separated from each other.

Referring to FIG. 1A, there is shown an electrochromic device 10 featuring a flexible tape 12 (minus the release layer) affixed to a rigid substrate 14. The tape is shown partially peeled away from the rigid substrate to better illustrate the construction of device 10. In use, device 10 is connected to a power supply of conventional design using well-known connecting means.

Figure 1B:
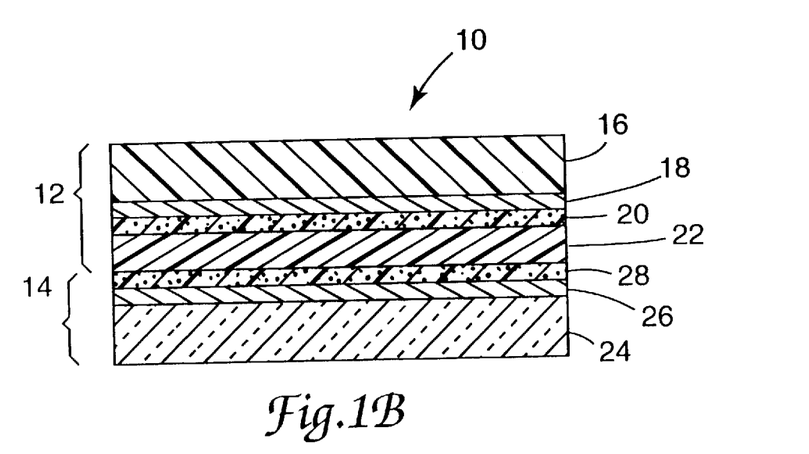
FIG. 1B is an expanded cross-sectional view of the device shown in FIG. 1A.

FIG. 1B is an expanded cross-sectional view illustrating the construction of device 10. As shown in the figure, tape 12 features a flexible substrate 16 provided with a transparent electronic conductor 18, an ion-storage material 20, and an ion-conducting electrolyte 22. Flexible substrate 16 is preferably a plastic film such as polyethylene terephthalate or polycarbonate. The transparent electronic conductor 18 preferably is indium-tin oxide (ITO) or a thin layer of a metallic material such as gold or platinum. Flexible, plastic films provided with a transparent conductor are well-known and commercially available, e.g., from Southwall Technologies, Inc. of Palo Alto, Calif.

Ion-storage material 20 is an ion-intercalating material that stores ions (e.g., hydrogen or metal ions such as lithium ions) and then, in response to an applied electrical potential, releases the ions for intercalation into electrochromic material 28. Suitable ion-intercalating materials for this purpose are well-known and include electrochromic, weakly electrochromic, and non-electrochromic materials. Examples include group V metal oxides (e.g., niobium and vanadium oxides), group VI metal oxides (e.g., tungsten and molybdenum oxides), and group VIII metal oxides (e.g., nickel, cobalt, iridium, and rhodium oxides). The preferred material is $V_2O_5$.

Ion-conducting electrolyte 22 preferably is a polymer electrolyte having the properties of a pressure sensitive adhesive, although other types of adhesives (e.g., hot melt adhesives, in which the adhesive property manifests itself at elevated temperatures) can also be used. The electrolyte secures tape 12 to rigid substrate 14. It also conducts ions between ion-storage material 20 and electrochromic material 28 in response an applied electrical potential. The electronic conductivity of the material, however, is minimized in order to avoid shorting out the device.

A thin (c.a. 500 angstrom) barrier layer (not shown) may be provided between the electrolyte and the ion-storage material to isolate the electrolyte from the ion-storage material, and thereby extend the lifetime of the device. Examples of suitable barrier layer materials are well-known and include tungsten oxide, nickel oxide, and niobium oxide.

A particularly preferred material for electrolyte 22 is the crosslinked polymerization product of thiol and ene monomers prepared in a solvent-free process using ultraviolet radiation. Also suitable are polymers such as polysiloxanes and siloxane copolymers (e.g., high molecular weight polysiloxanes having a molecular weight of at least 20,000), polyalkylene oxides (e.g., polyethylene oxide), polyacrylates, polyvinyl alcohol, polyvinyl acetal, polyvinyl acetate, and poly-2-acrylamide-2-methyl-propane sulfonic acid ("polyAMPS"), as well as copolymers thereof. The polymers, if desired, may be swollen with solvent or combined with tackifiers in order to increase the tackiness of the polymer or modify the ionic conductivity.

Rigid substrate 14 forms the second half of device 10. It features a rigid material 24 such as glass or plastic (e.g., a clear plastic such as polycarbonate or polymethyl methacrylate) provided with a transparent electronic conductor 26. Both glass and plastic materials provided with transparent electronic conductors are well-known and commercially available, e.g., from Libbey-Owens-Ford Co. of Ottawa, Ill. in the case of glass materials.

Rigid substrate 14 further includes an electrochromic material 28 whose optical properties change upon application of an electrical potential. Electrochromic materials are well-known and include metallic oxides or combinations of oxides of group IV, V, VI, and VIII metals. In particular, the electrochromic material can be selected from the class consisting of metal oxyhalides, sulfides, tungstates, molybdates, stannates, vanadates, chromates, titanates, selenides, and tellurides. The preferred electrochromic material is $WO_3$.

Figure 2A:
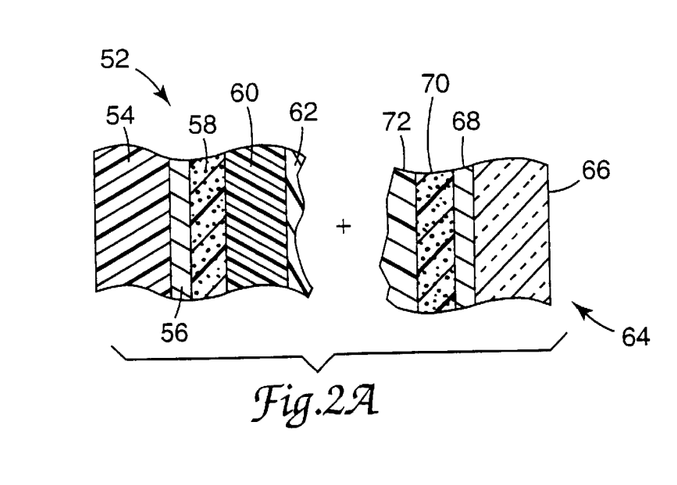
FIGS. 2A and 2B are schematic drawings illustrating two methods of assembling an electrochromic device using tapes according to the invention.
Figure 2B:
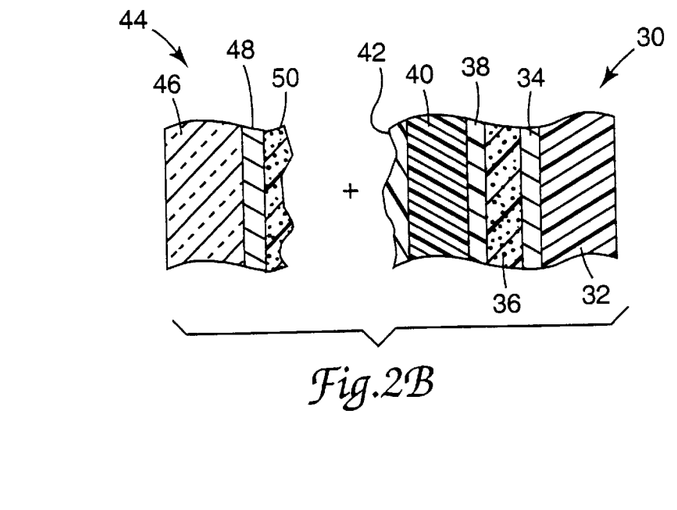

FIG. 2b schematically illustrates the preparation of an electrochromic device using tapes according to the invention. In one embodiment, a tape 30 features a flexible plastic substrate 32 provided with a transparent conductor 34, an ion-storage material 36, a thin barrier layer 38, and a pressure sensitive polymeric ion-conducting electrolyte 40. A release layer 42 is provided over the surface of electrolyte 40. The release layer, which protects the underly adhesive, is removed prior to laminating tape 30 to a rigid substrate 44 featuring a glass or plastic substrate 46 provided with a transparent conductor 48 and an electrochromic material 50. Alternatively, the release layer may be provided in the form of a low surface energy coating to the free surface of flexible substrate 32 (i.e., the surface opposite to the surface bearing transparent conductor 34), in which case it is not removed prior to lamination.

A second way of assembling the device (shown in FIG. 2a) involves using a tape 52 having a flexible plastic substrate 54 provided with a transparent conductor 56, an electrochromic material 58, and a pressure sensitive polymeric ion-conducting electrolyte 60. A release layer 62 is provided over the surface of electrolyte 60. As in the case of tape 30, described above, a low surface energy coating may be applied to the free side of substrate 54 in lieu of release layer 62. Tape 52 is laminated to rigid substrate 64 that includes a glass or plastic substrate 66 provided with a transparent conductor 68, an ion-storage material 70, and a barrier film 72.

The ion-storage material and electrochromic material are deposited on their respective substrates according to conventional techniques, including sputtering. In the case of $WO_3$ deposited on glass substrates, the preferred process is described in a commonly assigned U.S. patent application bearing Ser. No. 08/639,020 herein incorporated by reference. According to this process, an initial polytungstate solution (preferably an acidified ammmonium metatungstate solution) is treated with peroxide to form a peroxypolytungstate solution. The peroxypolytungstate solution is converted to a stable oxide polytungstate solution, preferably by (i) drying the peroxypolytungstate solution to form a powder; (ii) dissolving or dispersing the powder in an alcoholic solvent (e.g., ethanol), and (iii) heating the alcoholic solution. The stable oxide polytungstate solution is then transformed to tungsten oxide, e.g., by coating the solution onto a substrate, drying the coated solution to form a residue, and then heating the residue at a temperature ranging from about 100° C. to about 350° C.

The polymeric electrolyte may be coated onto the tape surface in the form of polymerizable monomer(s) or a prepolymer syrup, after which the tape is laminated to the rigid substrate and the monomer(s) or syrup cured, e.g., by exposure to ultraviolet radiation to generate the adhesive in situ; curing may also be accomplished prior to lamination. The electrolyte may also be applied to the tape surface in the form of an adhesive polymer using conventional techniques, e.g., knife coating, roll coating, or extrusion coating, after which the tape is laminated to the rigid substrate.

Figure 3:
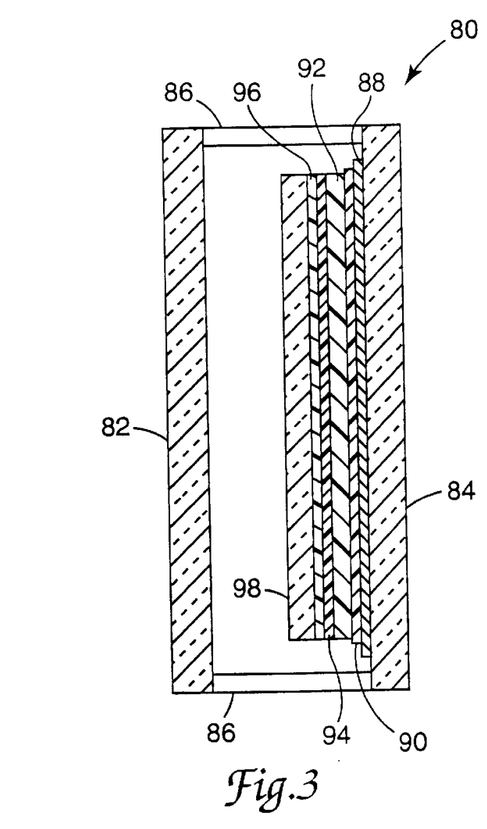
FIG. 3 is a cross-sectional view of a glazing unit according to the invention.

Electrochemical devices prepared using the above-described tapes may be incorporated into a glazing unit such as a window, as shown in FIG. 3. Glazing unit 80 features a pair of rigid transparent substrates (e.g., glass or plastic panes) 82, 84 maintained apart from each other by means of seals 86. The gap between substrates 82, 84 defines a thermal break that provides insulating properties to the glazing unit.

One of the substrates (shown in FIG. 3 as substrate 84) is provided with a transparent conductor 88 and supports an electrochemical device featuring an electrochromic material 90 (e.g., $WO_3$) and an ion-storage material 94 (e.g., $V_2O_5$) separated by a polymeric electrolyte 92. A flexible plastic substrate 98 provided with a transparent conductor 96 overlays the electrochromic device to complete the construction. In use, the electrochromic device is connected to a power supply of conventional design using well-known connecting means (not shown).

The glazing unit is prepared according to the method described above by providing substrate 84 (having transparent conductor 88) with electrochromic material 90 and then laminating a tape featuring flexible substrate 98, transparent conductor 96, ion-storage material 94, and polymeric electrolyte 92 to the electrochromic material. Alternatively, the polymeric electrolyte may be provided on the surface of the electrochromic material, rather than incorporated in the tape. In yet another alternative, the tape is provided with the electrochromic material, rather than the ion-storage material.

The invention will now be described further by way of the following examples.

EXAMPLES

Test Apparatus and Procedure

Electrode Preparation

About 20 g of 99.9%+ ammonium metatungstate powder (Pfaltz & Bauer, Waterbury, Conn.) was dissolved in about 100 g of distilled, de-ionized water. A cylindrical, gravity-fed ion exchange column (60 cm long with a 4 cm inner diameter) was filled with 90 cm³ of AMBERLITE IR 120+ acidic ion exchange resin (Aldrich Chemical, Milwaukee, Wis.). The aqueous ammonium metatungstate solution was then added to the column, and drained through the column at a rate of about 50–70 cm³ per minute. When the pH of the effluent rapidly changed from neutral to highly acidic (i.e., having a pH<2), collection began. The total amount of material collected was about 130 mLs.

Next, about 10 g of 30% hydrogen peroxide (Mallinckrodt Chemical Co., Paris, Ky.) was added to the acidified ammonium metatungstate solution collected from the ion exchange column, and the resulting solution stirred for 30 minutes. The solution was then dried on a rotary evaporator at 40° C. to a non-tacky solid in about 45 minutes. About 90 mL of absolute ethanol was added to the dried powder, after which the mixture was stirred at about 60° C. for about 1 hour until the powder had dissolved. About 5 mL of distilled, de-ionized water was then added to the ethanol solution, followed by refluxing at the boiling point (about 77° C.) for about 90 minutes. The resulting stable oxide polytungstate solution contained about 17% by weight tungsten oxide and had a room temperature viscosity of about 2.5 centistokes.

FTO-coated glass plates (Libbey-Owens-Ford, Toledo, Ohio) were dipped into a beaker containing the stable oxide polytungstate solution and withdrawn at a rate of about 20 cm per minute. The coated samples were then air-dried, after which they were heat-treated at about 225° C. for about 20 minutes in a box furnace to form an electrochromic tungsten oxide coating. Based upon the weight gain of a sample having a known surface area, the average coating thickness was calculated to be approximately 3000 angstroms, assuming a density of about 5.0 g/cm³ for the amorphous tungsten oxide coating.

Samples were tested using the electrochemical test method described below with a lithium triflate/acetonitrile electrolyte solution.

Lamination Process

The laminator consisted of a movable table (46 cm×23 cm) equipped with restraining bars and a 5.1 cm diameter× 23 cm long rubber-covered roller, which was adjusted to apply approximately $5.5 \times 10^4$ Pascals (8 psi) pressure to the laminate and an electric motor to power the roller across the table at a rate of approximately 300 cm/minute.

Electrochemical cells were prepared as follows: A $WO_3$-coated glass plate was scribed along one edge to form an electrically-separate FTO section and residual $WO_3$ was removed from this section. The plate was then positioned on the table of the laminator, its position being maintained by the restraining bars. A copper foil backed pressure sensitive tape having a conductive adhesive (Scotch™ No. 1182, available from 3M Co., St. Paul, Minn.) was laminated to an uncoated ITO portion of the polymer electrolyte coated flexible electrode to afford connection to the electrode. The coated flexible electrode was adhered to one edge of the $WO_3$ coated glass electrode such that the Cu buss bar was aligned with or in contact with the separate FTO section and the roller of the laminator placed over that portion of the coated flexible electrode. The roller was then activated to laminate the remaining portion of the coated flexible electrode/buss bar assembly to the glass plate to form an electrochromic device.

Electrochemical Test Method

The electrochemical test apparatus consisted of a scanning potentiostat (Model 100B, available from Bioanalytical Systems, West Lafayette, Ind. or Model 362, available from EG&G PARC, Princeton, N.J.), a 3 electrode cell containing the test electrode, a Ag/AgCl reference electrode, and a Pt auxiliary electrode, and a test solution of 0.1N $CF_3SO_3Li$ (lithium triflate, available as FC-122 from 3M Co.) (or lithium trifluoromethanesulfonylimide, available as HQ-115 from 3M) in acetonitrile. Charging and discharging were done at −1.0 and +1.0 volts, respectively.

Optical Transmission

Optical transmission of test cells was determined using an integrated optical densitometer featuring a quartz halogen lamp Type 2604-A equipped with a blue filter (Photographic Type 80-A) as a light source that corrects temperature to approximate day light. The detector was a crystalline silicon photodiode (NCH TR5-5020H).

EXAMPLE 1

The indium tin oxide (ITO) surface of a 0.18 mm (7 mils) thick poly(ethylene terephthalate) film (PET) having a 30 Ω/sq ITO coating (available from Southwall Technologies Inc., Palo Alto, Calif.) was sputter coated with a 180 nm thick vanadium oxide layer followed by a 10 nm thick tungsten oxide layer. (Both the vanadium oxide and tungsten oxide layers were applied by DC magnetron sputtering at 6 kW, 0.8 Pa and an argon to oxygen ratio of 4.) The thus produced layered structure was converted to lithiated vanadium oxide by electrochemical reduction methods in a 0.1M lithium triflate solution in acetonitrile using a voltage of −1.0 V relative to a silver chloride reference electrode. The reduced electrode was rinsed in acetonitrile and dried in a vacuum (<1 mm Hg) at room temperature.

A mixture of 1,8-dimercapto-4,7-dioxooctane (1.73 g, 9.5 mmole, available from Nisso Maruzen Chemical, Tokyo, Japan), polyethylene glycol 400 diallyl ether (5.160 g, 10 mmole, prepared as described below), poly(3-mercaptopropyl)methyidisiloxane (0.067 g, 0.5 mmole, available from United Chemicals Technologies, Inc., Bristol, Pa.), 2,2-dimethoxy-2-phenyl acetophenone (7 mg, available as KB-1 from Sartomer Chemical, Exton, Pa.), and lithium trifluoromethanesulfonylimide (2.30 g, 8 mmol, available from 3M, St. Paul, Minn.) was shaken in a sealed glass bottle until all of the reactants had dissolved (approximately 2 hours). The resulting solution was irradiated with black light ($\lambda_{max}$ 365 nm) for approximately 20 seconds to obtain a coatable prepolymer syrup.

The polyethylene glycol 400 diallyl ether was prepared by adding allyl bromide (48.0 g, 0.4 mol, available from Aldrich Chemical Co.) dropwise, to a mixture of polyethylene glycol 400 (80 g, 0.2 mol, available from Dow Chemical, Midland, Mich.) and sodium hydroxide (10.0 g, 0.25 mol) and the resulting mixture refluxed for 4 hours. After being cooled to room temperature, the reaction mixture was diluted with ether (100 mL) and the precipitate removed by filtration. The filtrate was washed with 5% HCl (100 mL), saturated sodium bicarbonate solution (100 mL), and dried over anhydrous sodium sulfate. Ether was removed form the solution on a rotary evaporator to produce a colorless fluid, the structure of which was confirmed by NMR analysis.

An approximately 0.13 mm (5 mils) thick coating of the prepolymer syrup was knife coated on the above described flexible electrode and the coating carefully covered with a silicone treated polyester release liner (available from Courtaulds, Canoga Park, Calif. as Part number 630122A) so as to not disturb the thickness of the prepolymer coating. The prepolymer syrup was cured by passing the laminate under a bank of fluorescent lamps (F40T12-350BL lamps commercially available from Osram Sylvania, Danvers, Mass.), with the release liner surface facing the lamps, for a total residence time of 3 minutes. The UV light profile was 330 mJ, 1.5 mW as measured with a UVIMAP Model #UM365H-S photometer (available from EIT Electronic Instrumentation Technology, Inc., Sterling Va.). Removal of the release liner exposed a clear, tacky, pressure-sensitive adhesive-like cured "thiol-ene" electrolyte tape. This flexible electrode/electrolyte construction was laminated to the tungsten oxide coated surface of the glass electrode according to the lamination process described above. Cell performance parameters are reported in Table 1 below.

TABLE 1

| Example | Color dark | Color bleach | Dynamic range percent transmission | Charge density | #Cycles | Decay | Current density | Voltage |
| --- | --- | --- | --- | --- | --- | --- | --- | --- |
| #1 | blue | taupe | 12% to 45% | 20 mC/cm2 | 10,000 | None | >>.15 mA/cm2 | −/+2.5 |
| #2 | blue | taupe | 10–15% to 40–50% | >15 mC/cm2 | >$10^3$ | None | >>.15 mA/cm2 | −/+2.5 |
| #3 | blue | taupe | 10–15% to 40–50% | >15 mC/cm2 | >$10^3$ | None | >>.15 mA/cm2 | −/+2.5 |
| #7 | blue | taupe | 10–15% to 40–50% | >15 mC/cm2 | >$10^3$ | None | >>.15 mA/cm2 | −/+2.5 |
| #8 | blue | taupe | 10–15% to 40–50% | >15 mC/cm2 | >$10^3$ | None | >>.15 mA/cm2 | −/+2.5 |

EXAMPLE 2

A "thiol-ene" electrolyte layer was prepared substantially as described in Example 1 except that electrolyte was formed between two pieces of release liner. A 0.13 mm (5 mils) thick coating of the prepolymer syrup was knife coated on the first release liner, the syrup carefully covered by a second release liner, and the laminated structure cured as described in Example 1. After curing, one liner was removed from the "thiol-ene" electrolyte and the electrolyte was heated to 80° C. in a dry atmosphere for 24 hours. The electrolyte was subsequently laminated onto the lithiated vanadium oxide surface of a PET film prepared as described in Example 1. The second release liner was removed and the flexible tape laminated onto the tungsten oxide coated surface of the glass electrode described above. Cell performance parameters are reported in Table 1.

EXAMPLE 3

A coated glass electrode was prepared substantially as described above except that an approximately 3800 angstrom thick tungsten oxide ion intercalation layer was ion sputtered over the fluorine doped tin oxide layer of the electrode using standard ion sputtering techniques. A flexible tape, prepared as described in Example 1, was laminated to the thus prepared glass substrate to form an electrochromic cell. Cell performance parameters are reported in Table 1.

EXAMPLE 4

A series of four polymer electrolyte films were prepared according to the procedure of Example 1 except that the polymer matrix for all four samples was based on a reaction mixture consisting of triethylene glycol divinyl ether (DVE-3, 1.980 g, 9.85 mmol, available from Aldrich Chemical, Milwaukee, Wis.), 1,8-dimercapto-4,6-dioxooctane (1.732 g, 9.5 mmol, available from Nisso Maruzen Chemical, Tokyo, Japan), triallyl cyanurate (0.025 g, 0.1 mmol, available from Aldrich Chemical), and 2,2-dimethoxy-2-phenyl acetophenone (KB-1, 4 mg). The concentration of lithium trifluoromethanesulfonate was systematically increased over the range indicated in Table 2 to provide a range of Li/(O+S) ratios, also indicated in Table 2. Cells were constructed with each polymer electrolyte film by laminating the film between two circular polished stainless steel electrodes, mounting the thus formed cells in aluminum cans with springs, and hermetically sealing the can.

TABLE 2

Conductivity as a Function of Li/(O + S) Ratio

| Sample | Grams $LiN(SO_2CF_3)_2$ | Mmol $LiN(SO_2CF_3)_2$ | Li/(O + S) Ratio |
|---|---|---|---|
| 4a | 2.870 | 10 | 1/5 |
| 4b | 2.296 | 8 | 1/10 |
| 4c | 1.148 | 4 | 1/20 |
| 4d | 0.574 | 2 | 1/40 |

Figure 4:
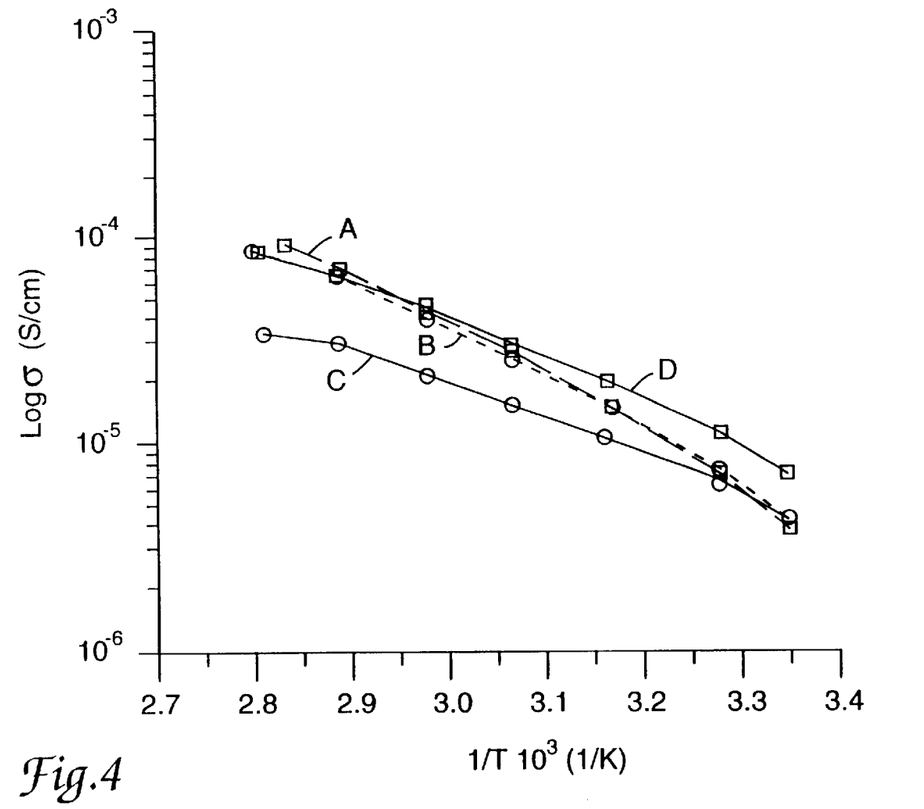
FIG. 4 is an Arrhenius plot showing conductivity of various electrolyte compositions as a function of lithium to (oxygen plus sulfur) ratio.

(The process of preparing the cells, mounting the cells in the can and sealing the can was carried out in an inerted dry box.) The cans were placed in a temperature controlled oven and the conductivity of each film determined over a temperature range of 23°–80° C. Arrhenius plots of the data obtained from these studies, which are presented in FIG. 4, where curve A corresponds to sample 4a, curve B corresponds to sample 4b, curve C corresponds to sample 4c, and curve D corresponds to sample 4d, demonstrate that the polymer electrolyte films have good conductivity over a wide range of Li/(O+S) ratios.

EXAMPLE 5

A series of polymer electrolyte films were prepared according to the procedure of Example 4 except that the Li/(O+S) ratio was held constant at 1/20 and four different Li salts were incorporated into the polymer electrolyte formulations as indicated in Table 3.

TABLE 3

Conductivity as a Function of Type of Li Salt

| Sample | Li Salt | Gm Salt | Mmol Salt |
|---|---|---|---|
| 5a | $LiN(SO_2CF_3)_2$[1] | 1.148 | 4 |
| 5b | $LiO_3SCF_3$[1] | 0.624 | 4 |
| 5c | $LiO_3SC_4F_9$[1] | 1.224 | 4 |
| 5d | $LiClO_4$[2] | 0.425 | 4 |

[1]Available from 3M.
[2]Available from Aldrich Chemical.

Figure 5:
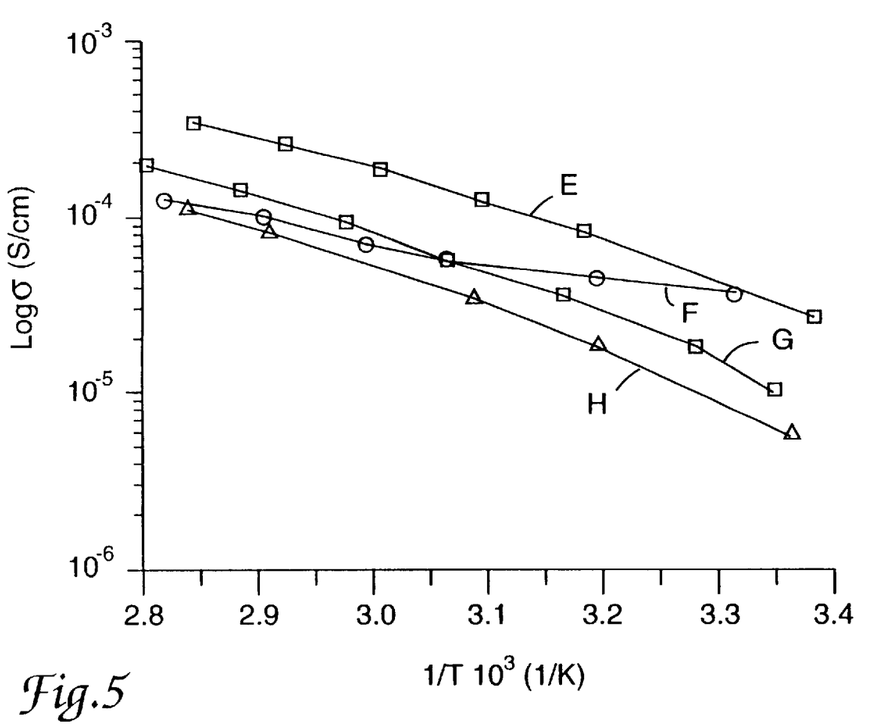
FIG. 5 is an Arrhenius plot showing conductivity of various electrolyte compositions as a function of type of lithium salt.

Arrhenius plots of the data obtained from these studies, which are presented in FIG. 5, where curve E corresponds to sample 5a, curve F corresponds to sample 5b, curve G corresponds to sample 5c, and curve H corresponds to sample 5d, demonstrates that the polymer electrolyte films have good conductivity with a range of salts, several of which do not exhibit a plasticizing effect on the polymer electrolyte.

EXAMPLE 6

A series of polymer electrolyte films were prepared according to the procedure of Example 4 except that the Li/(O+S) ratio was held constant at 1/20 and the crosslinker level was systematically varied from 0.2% to 2.0%, where the crosslinker level was defined as (meq triallyl cyanurate/ meq dithiol)×100%. These preparations were carried out at a X-linker level of the preparations described in Example 4. Actual weights and molar equivalents of the triallyl cyanurate used in the various samples is indicated in Table 4.

TABLE 4

Conductivity as a function of Crosslink Density

| Sample | Gm DVE-3 | meq DVE-3 | Gm Triallyl Cyanurate | Mmol Triallyl Cyanurate | X-linker Level (%) |
|---|---|---|---|---|---|
| 6a | 16.128 | 79.76 | 19.942 | 0.06 | 0.6 |
| 6b | 16.080 | 79.52 | 39.8844 | .12 | 1.2 |
| 6c | 16.032 | 79.28 | 59.824 | .18 | 1.8 |
| 6d | 15.984 | 79.04 | 79.768 | .24 | 2.4 |
| 6e | 15.936 | 78.80 | 99.708 | .30 | 3.0 |
| 6f | 15.816 | 79.24 | 149.564 | 0.45 | 4.5 |
| 6g | 15.696 | 77.60 | 199.416 | 0.6 | 6.0 |

Figure 6:
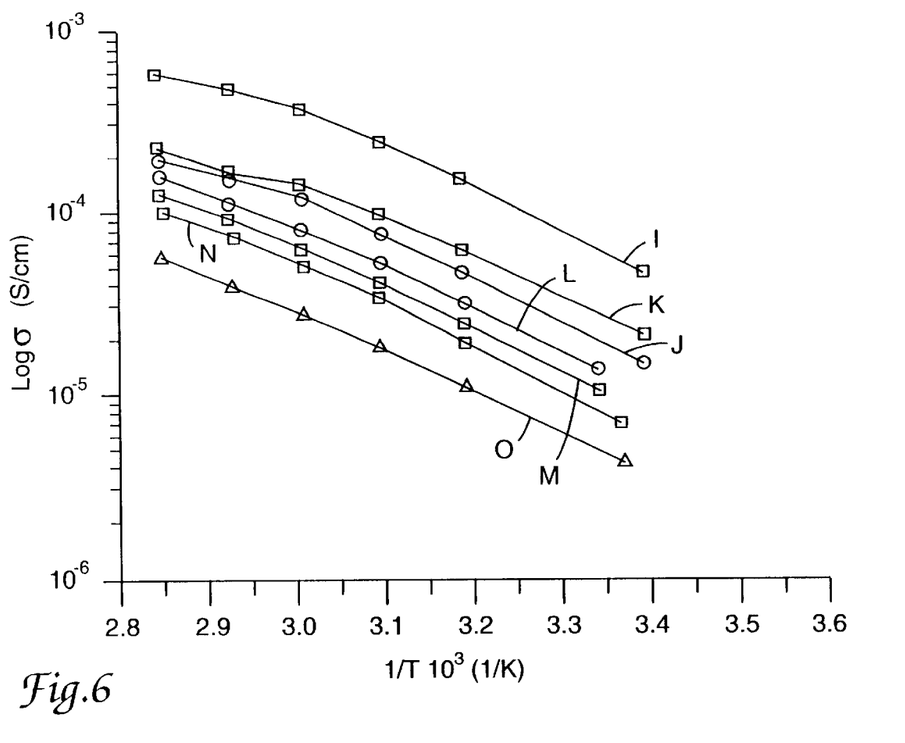
FIG. 6 is an Arrhenius plot showing conductivity of various electrolyte compositions as a function of crosslinking level.

Arrhenius plots of the data obtained from these studies, which are shown in FIG. 6, demonstrate that within the crosslinker range studied, lower crosslinker levels produced higher conductivities in the polymer electrolytes. In FIG. 6, curve (I) corresponds to Sample 6a, curve (J) corresponds to Sample 6b, curve (K) corresponds to Sample 6c, curve (L) corresponds to Sample 6d, curve (M) corresponds to Sample 6e, curve (N) corresponds to Sample 6f, and curve (O) corresponds to Sample 6g.

EXAMPLE 7

A high molecular weight (MW>20,000) polysiloxane electrolyte was prepared by a condensation reaction of a polyethylene glycol and bis-(dimethylamino)diethyl silane. Polyethylene glycol 400 (21.2 g, 0.053 mol, available from Aldrich Chemical, Milwaukee, Wis.) was dissolved in toluene (80 mL) and the solution heated to 90° C. under a dry nitrogen atmosphere. Bis-(dimethylamino)diethyl silane (9.7 g, 0.056 mol, available from Gelest, Inc., Tullytown, Pa.) was added dropwise, with stirring, to polyethylene glycol solution over a period of 4 hours. Heating and stirring were continued for approximately 24 hours, after which a rubbery solid was isolated by adding hexane (approximately 100 mL) to the reaction mixture. The rubber was dried under vacuum (30 mm Hg and 50° C.) for approximately 4 hours and a portion of the rubber (4 g) was redissolved in acetonitrile (20 mL) containing lithium triflate (1.5 g, available from 3M Co.). The solvent was evaporated under vacuum (40° C. and 30 mm Hg), the dried rubber was placed between a release liner and a flexible PET substrate coated with ITO and lithiated vanadium oxide, as described in Example 1, and the laminate was pressed in a hydraulic press to produce a 0.13 mm (5 mils) thick electrolyte layer. An electrochromic cell was prepared by removing the release liner and laminating the flexible tape to the $WO_3$ coated electrode described above. Cell performance parameters are reported in Table 1.

EXAMPLE 8

A lightly cross-linked high molecular weight (MW>20,000) polysiloxane electrolyte was prepared using a reaction similar to that described in Example 7. Polyethylene glycol 400 (21.2 g, 0.053 mol) was dissolved in toluene (80 ml) and the resulting solution heated to 90° C. under a dry nitrogen atmosphere. A mixture of bis-(dimethylamino)diethyl silane (9.7 g, 0.056 mol) and bis-(dimethylamino)ethyl vinyl silane (1.0 g, 0.006 mol, available from Gelest) were added dropwise, with stirring, to the polyethylene glycol solution over 4 hours. Heating and stirring were continued for approximately 24 hours, after which a rubbery solid was isolated by adding hexane (100 mL) to the reaction mixture. The rubber was dried under vacuum (40° C. and 30 mm Hg) for approximately 8 hours and a portion of the rubber (4 g) was redissolved in acetonitrile (20 mL) containing lithium triflate (1.5 g). After the solvent was evaporated, the rubber was incorporated into an electrochromic cell as described in Example 7. The solvent was evaporated, the rubber was placed between a release liner and a flexible PET substrate coated with ITO and lithiated vanadium oxide, prepared as described in Example 2, and the laminate was pressed in a hydraulic press to produce a 1.3 mm (5 mils) thick electrolyte layer. The polysiloxane electrolyte was crosslinked by irradiating the sample with UV light as described in Example 2 (330 mJ, 1.5 mW). The release liner was removed and the flexible tape laminated onto a $WO_3$-coated glass electrode as described in Example 1. Cell performance parameters are reported in Table 1.

Other embodiments are within the following claims.

What is claimed is:

1. A tape comprising an electronically conductive flexible substrate, a release element selected from the group consisting of removable release layers and low surface energy coatings, and an adhesive comprising an ion-intercalating material,
wherein when the adhesive of said tape is laminated to a second electronically conductive substrate comprising a second ion-intercalating material to form an electrochromic device, the device is capable of undergoing a visible change in transmission or reflectance upon application of a voltage.

2. A tape according to claim 1 wherein said ion-intercalating material is disposed between said substrate and said release layer.

3. A tape according to claim 1 wherein said release element comprises a low surface energy coating provided on one face of said substrate, said ion-intercalating material being provided on the opposing face of said substrate.

4. A tape according to claim 1 wherein said adhesive comprises a pressure sensitive adhesive.

5. A tape according to claim 1 wherein said adhesive comprises an electrochromic material.

6. A tape according to claim 5 wherein said adhesive further comprises an ion-conducting polymer electrolyte.

7. A tape according to claim 5 wherein said electrochromic material comprises $WO_3$.

8. A tape according to claim 1 wherein said flexible substrate comprises polyethylene terephthalate provided with a transparent conductor.

9. A tape according to claim 1 wherein said flexible substrate comprises a reflective substrate.

10. A tape according to claim 1 wherein said adhesive comprises an ion-storage material.

11. A tape according to claim 10 wherein said adhesive further comprises an ion-conducting polymer electrolyte.

12. A tape according to claim 10 wherein said ion-storage material comprises $V_2O_5$.

13. A method of assembling an electrochromic device comprising the steps of:
(a) providing a tape comprising an electronically conductive flexible substrate, a release element selected from the group consisting of removable release layers and low surface energy coatings, and an adhesive comprising a first ion-intercalating material;
(b) contacting a second electronically conductive substrate comprising a second ion-intercalating material with the adhesive of said tape,
one of said ion-intercalating materials comprising an electrochromic material and the other of said ion-intercalating materials comprising an ion-storage material; and
(c) laminating said tape and said second electronically conductive substrate together.

14. A method according to claim 13 wherein said second substrate comprises a rigid substrate.

15. A method according to claim 13 wherein said second substrate comprises a glass substrate provided with a transparent conductor.

16. A method according to claim 13 wherein said adhesive comprises an ion-intercalating material comprising an electrochromic material.

17. A method according to claim 16 wherein said adhesive further comprises an ion-conducting polymer electrolyte.

18. A method according to claim 16 wherein said ion-intercalating electrochromic material comprises $WO_3$.

19. A method according to claim 13 wherein said adhesive comprises an ion-conducting polymer electrolyte and an ion-intercalating material comprising an electrochromic material, and said second substrate comprises an ion-intercalating material comprising an ion-storage material.

20. A method according to claim 13 wherein said adhesive comprises an ion-intercalating material comprising an ion-storage material.

21. A method according to claim 20 wherein said adhesive further comprises an ion-conducting polymer electrolyte.

22. A method according to claim 13 wherein said ion-intercalating ion-storage material comprises $V_2O_5$.

23. A method according to claim 20 wherein said adhesive comprises an ion-conducting polymer electrolyte and an ion-intercalating material comprising an ion-storage material, and said second substrate comprises an ion-intercalating material comprising an electrochromic material.

24. An electrochromic device comprising an ion-intercalating electrochromic material and an ion-intercalating ion-storage material separated by an ion-conducting electrolyte and disposed between (a) a rigid, electronically conductive substrate comprising (i) a rigid layer and (ii) a transparent electronic conductor deposited on said rigid layer and (b) a flexible, electronically conductive substrate,
at least one of said electrochromic material, said ion-storage material, and said electrolyte being provided in the form of an adhesive.

25. An electrochromic device according to claim 24 wherein said electrolyte comprises an ion-conducting polymer electrolyte in the form of an adhesive.

26. A glazing unit comprising:
(a) an electrochromic device comprising an ion-intercalating electrochromic material and an ion-intercalating ion-storage material separated from each other by an ion-conducting electrolyte,
at least one of said electrochromic material, said ion-storage material, and said electrolyte being provided in the form of an adhesive,
said device being disposed between (a) a rigid, electronically conductive substrate comprising (i) a rigid layer and (ii) a transparent electronic conductor deposited on said rigid layer and (b) a flexible, electronically conductive substrate, both of said substrates being electronically conductive; and
(b) a second rigid, transparent substrate adjacent said flexible transparent substrate.

27. A glazing unit according to claim 26 further comprising a third rigid, transparent substrate spaced apart from said first rigid, transparent substrate or said second rigid, transparent substrate to define a thermal break.

28. A glazing unit according to claim 26 wherein said electrolyte comprises an ion-conducting polymer electrolyte in the form of an adhesive.

* * * * *

UNITED STATES PATENT AND TRADEMARK OFFICE
CERTIFICATE OF CORRECTION

PATENT NO. : 5,825,526
DATED : October 20, 1998
INVENTOR(S) : Silvia L. Bommarito, et al.

It is certified that error appears in the above-identified patent and that said Letters Patent is hereby corrected as shown below:

On the title page, item [75] the following inventors should be added:

--Phat Tan Pham, Little Canada, Minn; Kenton D. Budd, Woodbury, Minn.; and

Haitao Huang, Woodbury, Minn.--

Signed and Sealed this

Sixth Day of July, 1999

Q. TODD DICKINSON

*Attest:*

*Attesting Officer*     *Acting Commissioner of Patents and Trademarks*